May 20, 1930.  L. A. SWANSER  1,759,597
HARROW HITCH FOR GANG PLOWS
Filed Sept. 10, 1927
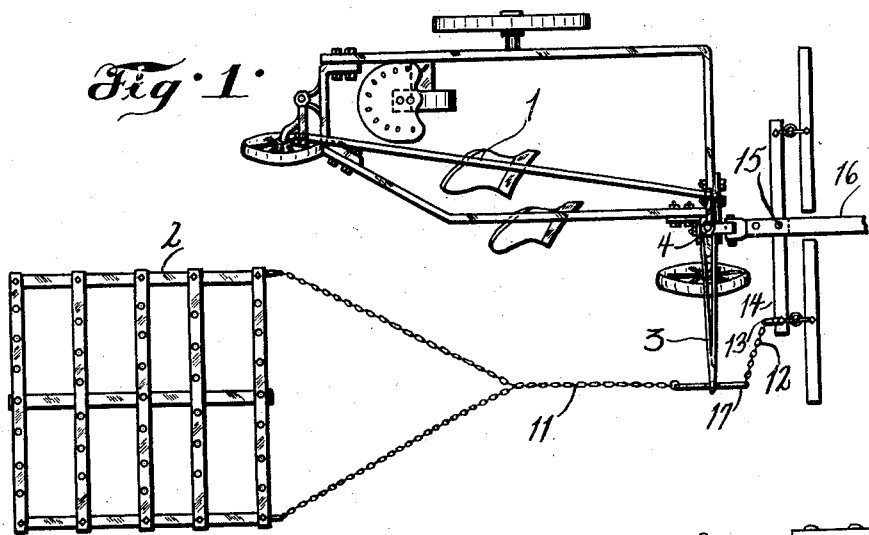
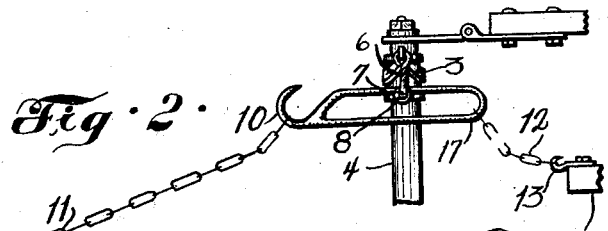
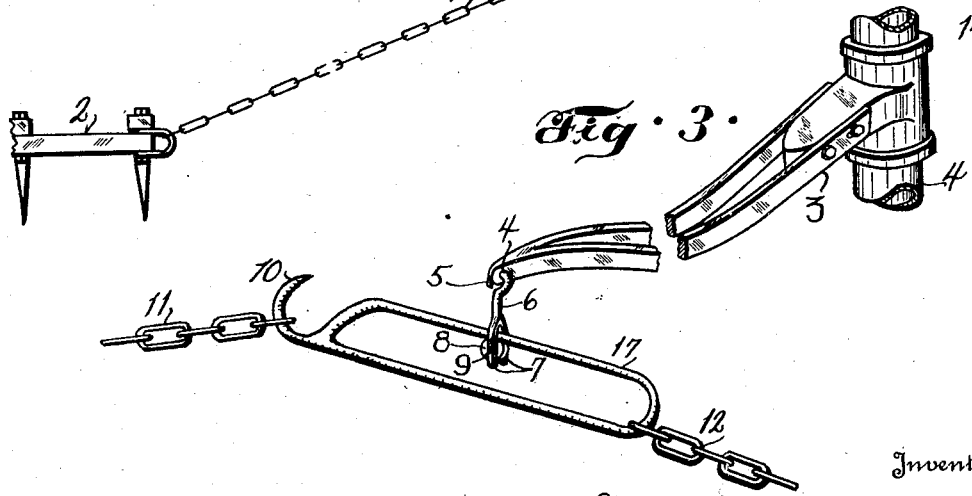
Inventor
Lawrence A. Swanser
By Adam E. Fisher.
Attorney Patented May 20, 1930

1,759,597

UNITED STATES PATENT OFFICE

LAWRENCE A. SWANSER, OF BRUSETT, MONTANA

HARROW HITCH FOR GANG PLOWS

Application filed September 10, 1927. Serial No. 218,731.

This invention relates to attaching means for connecting a harrow to a gang plow, either horse drawn or tractor drawn, and the object of the invention is to provide a relatively simple, efficient and practical device of the kind stated, whereby ground may be simultaneously plowed and harrowed.

In the drawing

Figure 1 is a plan view, showing a gang plow, a harrow, and my hitching elements for attaching the two together, the forward end of the tongue being broken away;

Figure 2 is an enlarged detail view in side elevation of the hitching elements as connected to a harrow, the rear section of the harrow being broken away, as also the lower portion of the forward or furrow wheel post, the forward end of the tongue and the forward edge of the double tree;

Figure 3 is an enlarged detail of the harrow arm and sliding link with sections of chain attached, the frontal or furrow wheel post being broken away at top and bottom.

In combination with the gang plow 1 and harrow 2, the invention comprises elements for hitching the two together in a practical and efficient manner. These elements include a harrow arm 3 rigidly attached to the wheel post 4 and extended laterally to the "plowed field" side of the plow. The extremity of this arm 3 is provided with an eye 4 through which is passed the hook 5 of a link 6, the lower end of the said link 6 being forked as shown at 7. A pulley 8 is mounted upon a short shaft 9 and the shaft is journaled by its ends in the fork 7 of the link 6. A slidable link 17 is mounted through the fork 7 and rides upon the pulley 8. This link 17 is provided at the rear end with a hook 10 for engaging the drag chain 11 attached to the harrow 2. A short connecting chain 12 is angularly extended between and connects the forward end of the link 17 with a hook 13 mounted upon the end of the double tree 14 pivoted at 15 upon the tongue 16.

In use the strain upon the tongue 16 is transmitted through the chains 12 and 11, and thus the harrow is drawn forwardly simultaneously with the plow 1. The slidable link 17 accommodates the play of the double tree 14. The angular disposition of the connecting chain 12 imparts a lateral oscillation to the link 17 transmitted from the double tree 14, which oscillation is in turn transmitted to the harrow 2 in its movement over the ground. This lateral oscillation of the harrow 2 is beneficial in the thorough breaking up of the plowed field. As shown in Figure 1, the extremity of the harrow arm 3 extends beyond the extremity of the doubletree 14, which necessitates the angular disposition of the chain 12. This arrangement is necessary in order to throw the harrow 2 well over onto the plowed ground.

While I have herein described a certain specific manner and method of constructing and assembling the elements of my invention, it is understood that I may vary from the same in minor details, not departing from the spirit of my invention, so as best to construct a practical device for the purpose intended, as defined in the appended claim.

I claim:

In a device of the kind described for associating a plow and harrow, the said plow being equipped with a conventional tongue and doubletree, a lateral harrow arm extended rigidly from the plow immediately back of the said doubletree, the extremity of the said arm being extended beyond the extremity of the said doubletree, a link depending from the extremity of the said harrow arm, the lower end of the link being forked, a pulley rotatably mounted within the fork of the said link, a slidable link mounted through the said fork and adapted to ride upon the said pulley, a chain connecting the rear end of the slidable link with the said harrow, and a chain angularly connecting the forward ends of the said slidable link with the extremity of the said doubletree.

In testimony whereof I affix my signature.

LAWRENCE A. SWANSER.